United States Patent [19]

Van de Bogert

[11] Patent Number: 4,467,892

[45] Date of Patent: Aug. 28, 1984

[54] MICROLUBRICATION CONTROL

[76] Inventor: David L. Van de Bogert, 226 Thistle Down Lane, Walworth, Wis. 53185

[21] Appl. No.: 261,847

[22] Filed: May 8, 1981

[51] Int. Cl.³ .................. F16N 29/02; G08B 21/00
[52] U.S. Cl. ........................................ 184/7.4; 184/6; 184/6.1; 184/6.4
[58] Field of Search ............... 184/6.1, 6.4, 7 D, 7 E, 184/7 F, 15 R, 15 A, 15 B, 1 C, 6, 6.14, 6.21, 6.22, 6.23, 6.24; 137/115, 625.48; 340/608, 609, 679, 682, 686

[56] References Cited

U.S. PATENT DOCUMENTS

| | | | |
|---|---|---|---|
| 2,029,198 | 1/1936 | Ross | 184/7 D |
| 2,313,351 | 3/1943 | Magnuson | 137/115 X |
| 2,396,147 | 3/1946 | Baldenhofer | 184/6.14 X |
| 2,467,576 | 4/1949 | Zimmermann | 137/115 X |
| 3,127,954 | 4/1964 | Callahan et al. | 184/7 D |
| 3,145,803 | 8/1964 | Cobert | 184/7 D |
| 3,213,884 | 10/1965 | Moyer et al. | 137/625.48 X |
| 3,237,636 | 3/1966 | Strader | 137/115 |
| 3,455,322 | 7/1969 | Chichester | 137/115 |
| 3,527,322 | 9/1970 | Roberts | 184/6.4 |
| 3,656,140 | 4/1972 | Gruber et al. | 184/6.4 |
| 3,678,631 | 7/1972 | Payne et al. | 184/6.4 X |
| 3,707,203 | 12/1972 | Roberts | 184/6.4 |
| 4,312,424 | 1/1982 | Taylor et al. | 184/6.4 |

FOREIGN PATENT DOCUMENTS 888142  1/1962  United Kingdom ............... 184/7 E

Primary Examiner—David H. Brown
Attorney, Agent, or Firm—Wheeler Law Firm

[57] ABSTRACT

Microlubrication system to divide and distribute a flow of lubricant automatically to one or more machines needing lubrication. Fail-safe, accurate distribution is provided by diverting flow of lubricant from the distribution system most of the time, allowing lubricant to be distributed only at intervals. When the lubricant is being distributed, it flows at a high enough rate to allow accurate metering and division of flow, but the overall delivery rate is low enough to prevent wasting the lubricant. The system is preferably provided with fail-safe means to ensure lubrication or to shut off the machines to be lubricated in the event lubrication fails and cannot be quickly restored.

5 Claims, 3 Drawing Figures

MICROLUBRICATION CONTROL

TECHNICAL FIELD

The present invention relates to an automatic system for distributing a lubricant to one or more machines, and more particularly to such a system for reliably supplying small amounts of a lubricant in a process known as microlubrication.

BACKGROUND ART

Distribution systems for providing a continuous flow of a fluid lubricant to one or more machines through a network of supply lines are well known. But the conventional flow metering and flow dividing equipment available to the art requires a certain minimum lubricant flow rate to provide accurate and reliable metering and division of flow. In microlubrication, in which only a very small quantity of a high quality lubricant is typically supplied, the average flow rate needed to lubricate is much smaller than the minimum lubricant flow rate for successful operation of known metering and dividing equipment. The result of using conventional microlubrication equipment at its rated minimum flow rate has thus been to waste much of the lubricant delivered to the machines.

In addition, prior microlubrication systems have not always had the desired high level of reliability, particularly when the minimum flow rate necessary to operate the flow metering and dividing equipment has not been maintained.

SUMMARY OF THE INVENTION

One aspect of the present invention is a microlubrication system of the type comprising a reservoir, a pump, and a distribution system connecting the pump to machines requiring lubrication. The improvement is bypass valve means added to the system between the pump and the distribution system to divert most of the flow from the pump back to the reservoir. The bypass valve means is periodically switchable to a state in which lubricant is supplied through the distribution system. Because the lubricant does not enter the distribution system most of the time, when it does enter the system it can do so at a high flow rate which is great enough to allow accurate metering and division of flow. Yet the average flow rate of the lubricant is quite low because the lubricant is delivered to the distribution means at a high rate for only a small proportion of the total lubrication time.

Another aspect of the present invention is a method for providing reliable microlubrication while reducing total lubricant use, comprising the steps of:
- A. providing a reservoir having an inlet and an outlet and containing a fluid lubricant;
- B. providing a flow of said lubricant at a first delivery rate from said reservoir outlet; and
- C. alternately directing said flow to said reservoir inlet and to lubricant distribution means for said at least one machine;

whereby to periodically charge the distribution means with a lubricant at the first delivery rate while providing a substantially smaller average lubricant delivery rate to the distribution means.

In a highly preferred embodiment of either aspect of the invention, fail-safe means are provided to regulate the lubrication system and the lubricated machines to protect against lubrication failure under all reasonably foreseeable circumstances.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Figure 1:
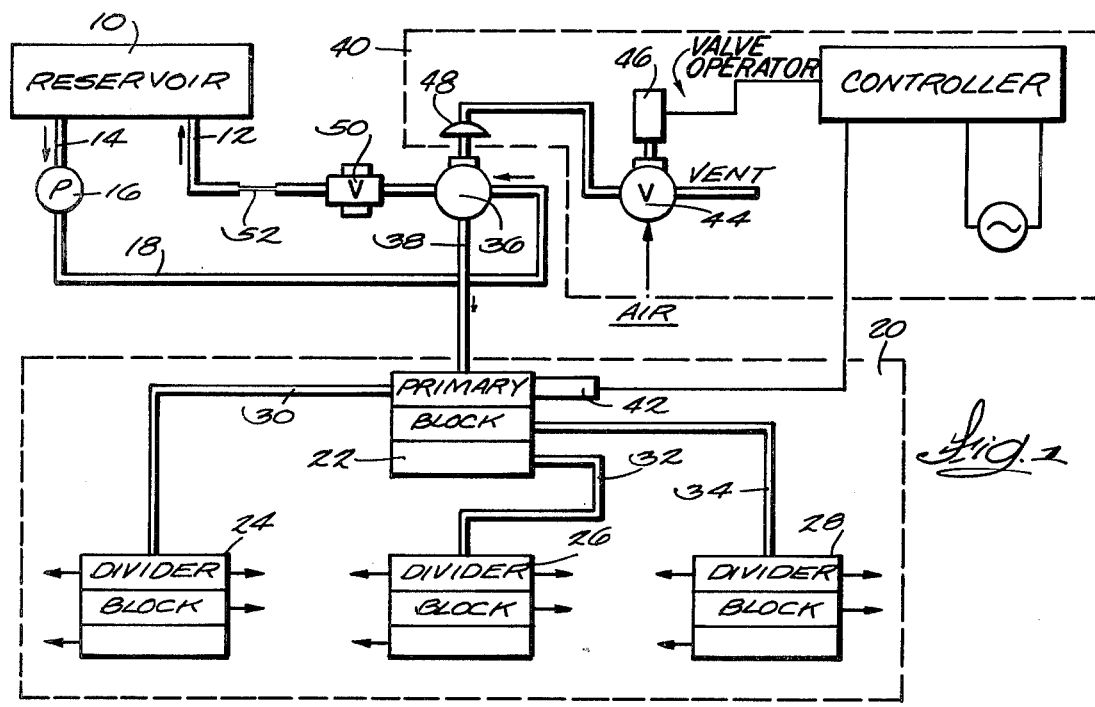
FIG. 1 is a schematic view of the microlubrication system of the present invention, showing the arrangement and cooperation of the parts thereof.

Referring first to FIG. 1, the microlubrication system, like those of the prior art, includes a reservoir 10 having an inlet 12 and an outlet 14. A lubricant is drawn from outlet 14 by a pump 16 and is pumped through a first conduit 18 into a distribution system 20 which meters and divides the flow of lubricant to provide for each machine (not shown) requiring lubrication. In this system a two stage division of flow is provided, the first stage being accomplished in a primary divider block 22 having plural outlets which are connected to secondary divider blocks 24, 26, and 28 by second conduits 30, 32 and 34 for further division of flow. A one stage or a three or more stage division of flow could also be provided. All of the distribution means downstream of the primary distribution block 22 will be considered to be second conduit means herein.

The system of FIG. 1 is distinguished from the prior art in several respects. First, bypass valve means 36 is provided between pump 16 and distribution system 20. Bypass valve means 36 has a first state allowing the flow of lubricant from first conduit 18 to enter distribution means 20 via conduit 38 and a second state diverting the flow of lubricant from first conduit 18 to reservoir inlet 12. The state of bypass valve means 36 is regulated by control circuit 40, which is explained below.

Another important aspect of the invention shown in FIG. 1 is feedback means 42, here attached to primary distribution block 22, to detect and signal the periodic distributions of lubricant throughout distribution system 20. Feedback means 42 is connected electrically to control circuit 40 and affects the operation thereof.

FIG. 1 also shows a pneumatic valve 44 having an electrical operator 46 to control the pneumatic operator 48 for bypass valve means 36; a sentry valve 50 which turns off the machines being lubricated in the event of a failure of lubricant pressure; and a flow restrictor 52 to maintain the pressure difference between reservoir inlet 12 and first conduit 18.

Figure 2:
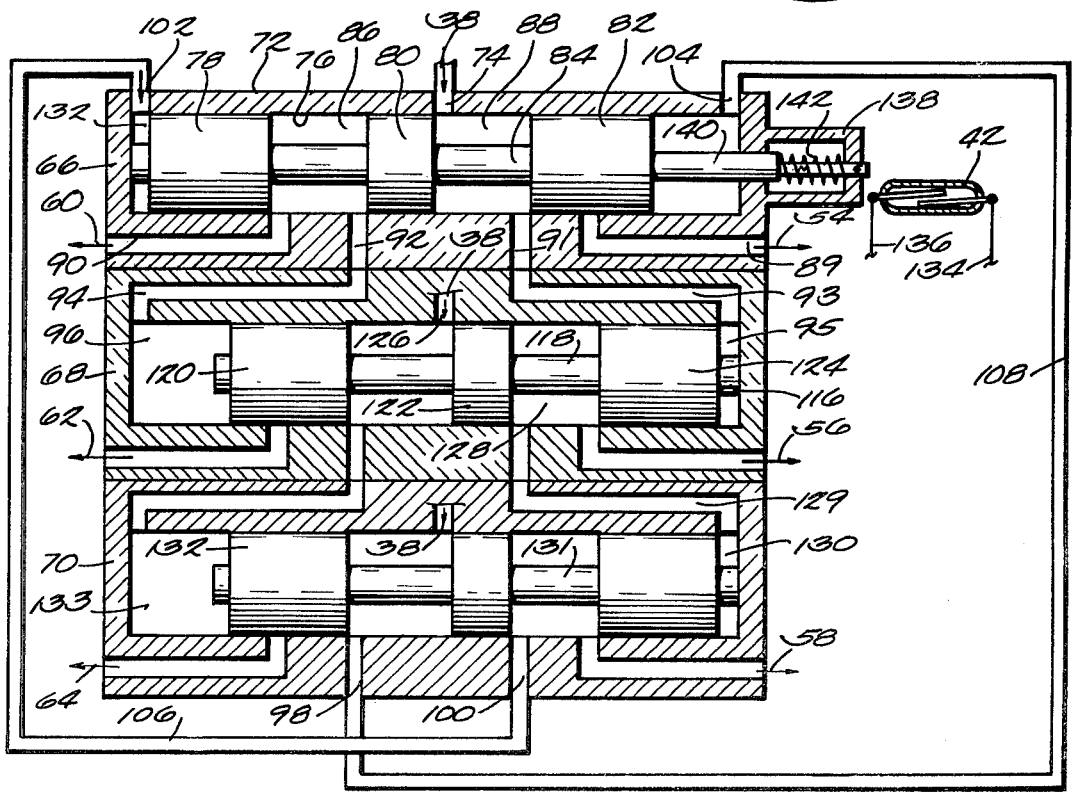
FIG. 2 is a schematic view of flow division apparatus usable as the primary or secondary divider blocks shown in FIG. 1.

FIG. 2 illustrates a typical divider block for use herein. The flow divider receives a flow of lubricant under pressure and divides this flow into metered charges which are sequentially ejected from outlets 54, 56, 58, 60, 62, and 64 for as long as a flow of lubricant passes through conduit 38. Each of the outlets is connected either to another divider or to a machine requiring lubrication, allowing for the possibility that some machines requiring a large amount of lubrication can be supplied directly and others requiring a small amount of lubrication can be supplied indirectly.

The flow divider shown in FIG. 2 comprises a stack of one or more units, here three identical two-way units 66, 68, and 70. Each unit such as 66 comprises a body or housing 72 having an inlet port such as 74 communicating between conduit 38 and the interior of a cylinder such as 76 which encloses, in sealing relation, axially spaced piston elements 78, 80, and 82, each rigidly fixed to a piston rod 84. Movable first and second chambers such as 86 and 88 are respectively defined by the generally annular space confined between piston elements such as 78 and 80 and by the space confined between piston elements such as 80 and 82 within cylinder 76. (Piston rod 84 does not impede flow through chambers 86 and 88.) Chamber 86 thus communicates with conduit 38 when the piston rod and its elements are displaced fully to the right, and chamber 88 communicates with conduit 38 when the piston rod and its elements are shifted fully to the left (as in FIG. 2).

Chambers 86 and 88 are connected by conduits 89 and 90 to lubricant outlets such as 54 and 60; chambers 86 and 88 are also connected by ports 91 and 92 via inlet conduits 93 and 94 with metering chambers 95 and 96 of the divider block unit 68 immediately beneath unit 66. Outlets 98 and 100 of the lowermost unit 70 are connected to the metering ports 102 and 104 of the top block by conduits 106 and 108.

Turning now to the operation of the divider block, FIG. 2 shows the divider block immediately after piston rod 84, carrying piston elements 78, 80 and 82, has been shifted to the left by means which will soon become apparent. Piston element 80, which blocked the path between inlet port 74 and outlet port 91 before it moved, now allows the lubricant to pass from conduit 38 to chamber 88, and then through outlet port 91. This flow does not move piston rod 84, since any tendency to push piston element 82 to the right is counterbalanced by a equal tendency to push piston element 80 to the left. The flow of lubricant from conduit 38 through element 66 is then directed through conduit 93 into metering space 95, driving piston rod 118 and the associated piston elements 120, 122 and 124 from the position shown in FIG. 2 completely over to the left. This shift causes piston element 120 to drive the lubricant which previously filled metering space 96 back through conduit 94, port 92, space 86, conduit 90, and outlet 60.

The shift of piston rod 118 to the left also opens communication from conduit 38 via inlet port 126 into space 128 between piston elements 122 and 124, causing a flow through conduit 129 into metering space 130 which drives piston rod 131 and the attached piston elements to the left. The leftward shift of piston rod 131 causes piston element 132 to force a charge of lubricant from metering chamber 133 through outlet 62 via a path opened by the previous shift of piston elements 120 and 122 to the left.

After all of the piston rods and piston elements have been sequentially driven to the left to dispense charges of lubricant from outlets 60, 62, and 64, the same process works in reverse; the pistons in units 66, 68, and 70 then move sequentially to the right to dispense charges of lubricant from outlets 54, 56, and 58. The divider thus works continuously in round-robin fashion to divide a continuous input into sequential charges to plural outlets.

FIG. 2 also shows the operation of feedback means 42. Reference character 42 identifies a reed switch which is normally open except when brought under the influence of a magnetic field to allow current to flow between terminals 134 and 136. A magnetized extension 140 of piston rod 84 protrudes through the extended right-hand wall 138 of unit 66, or alternatively a separate magnet follows the end 140 of the piston rod. When the magnet extends to the right, it closes the contacts of reed switch 42. End 140 is biased to the left by a compression spring 142, which is normally insignificant compared to the hydraulic pressure exerted on the piston elements in the flow divider. Thus, unless the flow within the divider dictates otherwise, piston rod 84 tends to move to the left to open reed switch 42.

The operation of the feedback means is as follows. While lubricant is flowing through conduit 38 piston rod 84 is moved to the left, opening reed switch 42 until all the piston elements have moved to the left, after which piston rod 84 moves to the right and recloses reed switch 42. Reed switch 42 is thus opened at the beginning of a cycle of the divider and returned to its closed position at the end of a cycle of the flow divider. As a result, a source of electric power connected to terminals 134 and 136 creates a pulse (transmitted to control means 40) each time the flow divider successfully completes a cycle.

Figure 3:
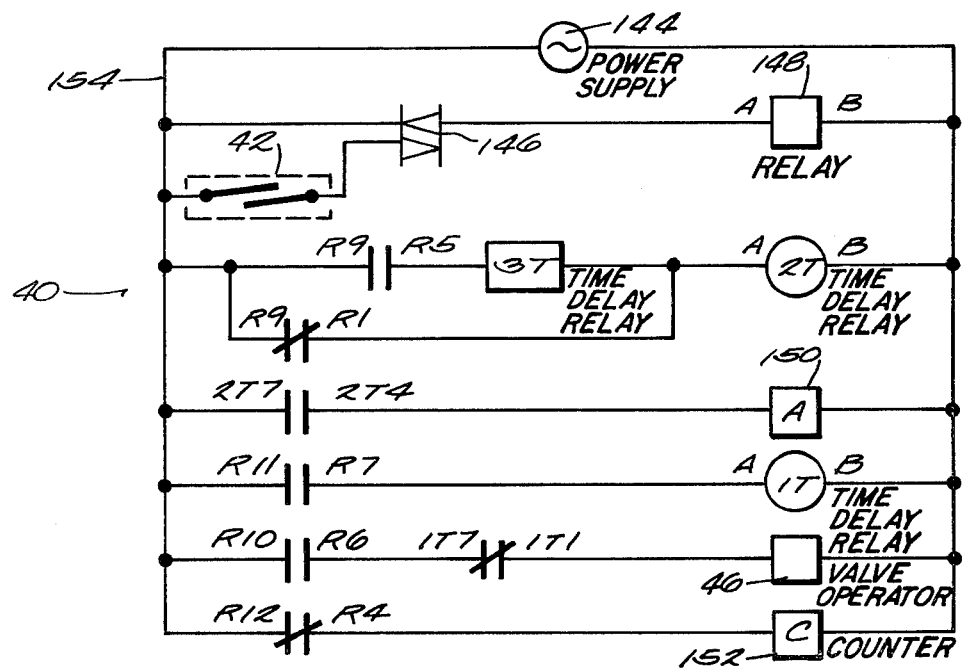
FIG. 3 is a schematic electric circuit diagram for the controller shown in FIG. 1.

FIG. 3 shows the elements of control circuit 40 and their connection to the mechanical elements of the system. Control circuit 40 comprises a fused power source 144, a triac 146, reed switch 42, a relay 148, a first time-delay relay 1-T, a second time-delay relay 2-T, a third time-delay relay 3-T, electrically operated alarm or shut-off means 150, the electric operator 46 for pneumatic valve 44 (which in turn controls bypass valve 36), and optionally a counter 152.

The relay coil terminals for time-delay relays 1-T and 2-T and for relay 148 are respectively marked A and B. The contacts of relay 148 are paired into normally open and normally closed pairs of contacts R-9 and R-5, R-11 and R-7, R-10 and R-6 are normally open pairs of contacts operated by relay 148. R-12 and R-4, and also R-9 and R-1, are normally closed pairs of contacts for relay 148. Similarly 1-T7 and 1-T1 are a normally closed pair of contacts operated by time-delay relay 1-T, and 2-T7 and 2-T4 are a normally open pair of contacts operated by time-delay relay 2-T.

Time-delay relays 1-T and 2-T each can be set for a time interval ranging from a few tenths of a second to several hours. Each is an on-delay timer, meaning that when electric power is applied to terminals A and B the relays 1-T and 2-T do not close until the preset time interval elapses, and each timer resets each time the voltage provided at its terminals A and B fails and returns. Time-delay relays 1-T and 2-T can each be a Series 328 MOS time-delay relay, available from Automatic Timing and Controls Co., King of Prussia, Pa. Timer 2-T is normally set for a time interval slightly longer than that of 1-T. Time-delay relay 3-T also contains an on-delay timer of the same sort, except that its on-delay time interval is normally fixed.

The circuit works like this. Every time reed switch 42 closes, the current passing from conductor 154 through the reed switch activates triac 146, thus energizing the coil circuit of relay 148. This closes the normally open circuit through contacts R-11 and R-7, resetting and starting the timer in time-delay relay 1-T. If reed switch 42 remains closed long enough for time-delay relay 1-T to time out relay 1-T closes, breaking the normally closed connection between contacts 1-T7 and 1-T1.

Relay contact pair R-10 and R-6, time delay relay 1-T contact pair 1-T7 and 1-T1, and valve operator 46 are in series and function together as an AND logic element. If relay 148 is closed and timer 1-T has not timed out, then pneumatic valve operator 46 is energized (see FIG. 1), diverting the stream of air passing through pneumatic valve 44 to actuate by-pass valve operator 48 and thus divert the flow of lubricant to reservoir 12 from conduit 38. If relay 148 is open, usually because reed switch 42 is open, flow is not diverted because contact pair R-10 and R-6 are open. Likewise, if reed switch 42 remains closed too long, relay 148 remains closed long enough to allow the timer in time-delay relay 1-T to time out, opening the connection between normally closed contact pair 1-T7 and 1-T1 to deenergize valve operator 46 and allow the flow of lubricant to enter and traverse conduit 38 for distribution. This means that if reed switch 42 is either on or off for an excessive length of time, continuous lubrication will be started.

In the present invention further means are preferably provided to prevent failure of lubrication in case time delay relay 1-T itself fails to operate correctly. This safety function is provided by time-delay relays 2-T and 3-T and alarm 150, which work together as follows. When reed switch 42 (and thus relay 148) closes, the normally open connection between relay contacts R-9 and R-5 is closed. Current then is supplied to time-delay relay 3-T. Time-delay relay 3-T is set to close after a time delay of more than 50 milliseconds, which is sufficient time to reset 2T before the connection between R-9 and R-5 is again opened, time-delay relay 2-T resets and starts to run. If time-delay relay 2-T then times out, the normally open connection between contacts 2-T7 and 2-T4 is closed, sounding alarm 150. (Alarm 150 can be a signaling device to call attention to a failure, a shut-off solenoid to turn off the machines needing lubrication, both, or other protective means.) Thus, if reed switch 42 remains closed too long, corrective action will be taken.

On the other hand, if reed switch 42 remains open too long, leaving relay 148 off too long, electric power from conductor 154 will pass through normally closed pair of contacts R-9 and R-1, and from there to time-delay relay 2-T, which resets and starts. If the time-delay relay 2-T times out before read switch 42 and relay 148 close again alarm 150 will operate.

Finally, to allow lubricant flow cycles to be monitored a counter 152 is provided which advances one count every time reed switch 42 opens, causing electricity to flow through normally closed pair of contacts R-12 and R-4.

The present system has several fail-safe features which prevent it from ever misfunctioning. Reed switch 42 and relay 148 and the related conductors can neither remain open nor closed too long without releasing by-pass valve 36 to allow lubricant to continuously flow through conduit 38. If time-delay relay 1-T fails the independent alarm system will shut off the machines to be lubricated or create an alarm to avoid damaging the machines.

If electric power source 144 fails altogether, such as if the fuse opens, the failure of all power releases valve operator 46, venting pneumatic operator 48 and thus switching bypass valve 36 to allow flow through the distribution system. If the supply of lubricant in reservoir 10 fails, or if the lubricant pressure fails, sentry valve 50 will shut down the machines being operated.

To accomplish the aims of the present invention, the timers in time-delay relays 1-T and 2-T are set to time intervals which are very long compared to the time required for one complete delivery of lubricant by primary block 22, which is usually only a few minutes. Thus, several hours may elapse between lubrication periods of a few minutes, so the net flow rate to the machines being lubricated is very low. Yet, when oil is flowing it is flowing at a fairly high flow rate which suffices to permit divider blocks 22, 24, 26, and 28 to accurately divide and meter the flow of lubricant.

I claim:
1. In a microlubrication system comprising:
   A. a reservoir containing a fluid lubricant and having an inlet and an outlet;
   B. pump means to provide a continuous flow of said lubricant from said outlet at a first delivery rate; and
   C. distribution means for directing said flow to at least one machine requiring lubrication;
   the improvements comprising:
   D. bypass valve means between said pump means and said distribution means, said bypass valve means having a first state allowing said continuous flow of lubricant to enter said distribution means and a second state diverting said continous flow of lubricant to said reservoir inlet; and
   E. control means periodically switching the state of said bypass valve means;
   whereby to reduce the average flow of said lubricant to said distribution means to substantially less than said first delivery rate, and further comprising:
   F. feedback means to detect and signal the periodic distributions of said lubricant,
   G. machine protection means and timer means to actuate said machine protection means whenever the time interval between successive periodic distributions of said lubricant exceeds a predetermined time interval, and wherein said machine protection means comprises means to maintain said bypass valve means in said first state.
2. The microlubrication system of claim 1, wherein said machine protection means comprises an alarm.
3. In a microlubrication system comprising:
   A. reservoir means providing a continuous flow of a fluid lubricant under pressure;
   B. at least one divider block to divide said flow of lubricant into discrete charges sequentially distributed among plural outlets;
   C. a first conduit connecting said reservoir means to said at least one divider block; and
   D. second conduits for connecting a machine requiring lubrication to each of said outlets;
   the improvements comprising:
   E. bypass valve means in said first conduit, said bypass valve means having a first state permitting said continuous flow of lubricant to flow from said reservoir means to first said conduit and a second state requiring said continuous flow of lubricant to return to said reservoir means;
   F. feedback means to detect delivery of a group of charges of said lubricant through said second conduits, said group of charges together constituting one charge through each said second conduit and said feedback means being adapted to send a signal only if each charge passes through its respective second conduit;

G. control means periodically switching the state of said bypass valve means; whereby to provide in said first conduit an intermittent flow of lubricant having a transient flow rate substantially exceeding its average flow rate; and further comprising:

H. first timing means to return said bypass valve means to said first state whenever the time interval between successive deliveries of said charge of lubricant exceeds a first preset valve.

4. In a microlubrication system comprising:
A. reservoir means providing a source of a fluid lubricant under pressure;
B. at least one divider block means to divide said flow of lubricant into discrete charges sequentially distributed among plural outlets;
C. a first conduit connecting said reservoir means to said divider block means; and
D. second conduits for connecting a machine requiring lubrication to each of said outlets;

the improvements comprising:
E. bypass valve means in said first conduit, said bypass valve means having a first state permitting said lubricant to traverse said first conduit and a second state requiring said lubricant to return to said reservoir means;
F. control means periodically switching the state of said bypass valve means;
G. feedback means to detect each delivery of a charge of said lubricant through one of said second conduits;
H. alarm means and
I. second timing means to actuate said alarm means whenever the time interval between successive deliveries of said charge of lubricant exceeds a second preset value;

whereby to provide in said first conduit an intermittent flow of lubricant having a transient flow rate substantially exceeding its average flow rate.

5. In a microlubrication system comprising:
A. reservoir means providing a source of a fluid lubricant under pressure;
B. at least one divider block to divide said flow of lubricant into discrete charges sequentially distributed among plural outlets;
C. a first conduit connecting said reservoir means to said divider means; and
D. second conduits for connecting said machines requiring lubrication to said outlets;

the improvements comprising:
E. bypass valve means in said first conduit, said bypass valve means having a first state permitting said lubricant to traverse said first conduit and a second state requiring said lubricant to return to said reservoir means;
F. control means periodically switching the state of said bypass valve means;
G. feedback means to detect each delivery of a charge of said lubricant through one of said second conduits;
H. switch means actuatable to disable said machines; and
I. second timing means to actuate said switch means whenever the time interval between successive deliveries of said charge of lubricant exceeds a second preset value;

whereby to provide in said first conduit an intermittent flow of lubricant having a transient flow rate substantially exceeding its average flow rate.

* * * * *